United States Patent [19]
Baturka

[11] 3,719,367
[45] March 6, 1973

[54] COLLET CHUCK FOR THREADED SHANK TOOLS

[75] Inventor: Walter Baturka, Frankenmuth, Mich.

[73] Assignee: Houdaille Industries, Inc., Buffalo,

[22] Filed: Sept. 1, 1971

[21] Appl. No.: 177,050

[52] U.S. Cl..................279/1 A, 279/1 ME, 279/1 S, 279/52, 82/34 C
[51] Int. Cl..........................B23b 31/30, B23b 31/04
[58] Field of Search........279/1 A, 1 ME, 1 S, 46, 48, 279/51, 52, 99, 100, 101, 7; 82/34 C

[56] References Cited

FOREIGN PATENTS OR APPLICATIONS 204,516   11/1956   Australia...............................279/1 S

*Primary Examiner*—Francis S. Husar
*Attorney*—Carlton Hill et al.

[57] ABSTRACT

An adapter assembly or collet chuck for a tool holder includes a collet member that is internally threaded to receive a threaded shank tool, there being a backup screw providing a force on the end of the tool, the threads of the tool and of the backup screw being dissimilar in pitch or hand so that if the tool slips within the collet during usage, a force is developed between the dissimilar threads whereby further slipping is precluded.

25 Claims, 6 Drawing Figures

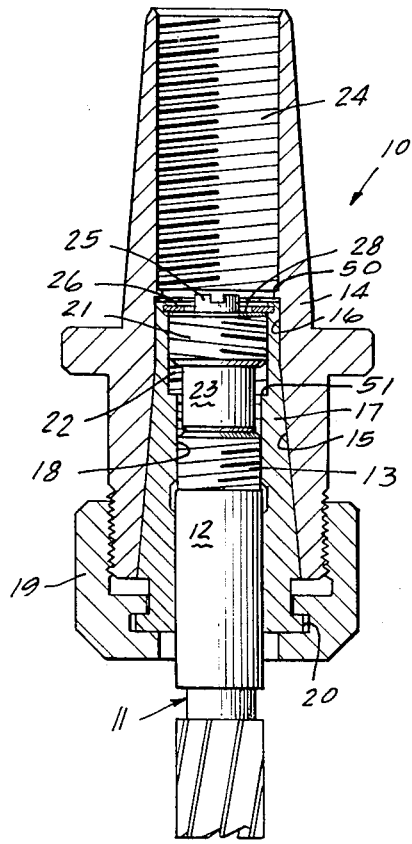
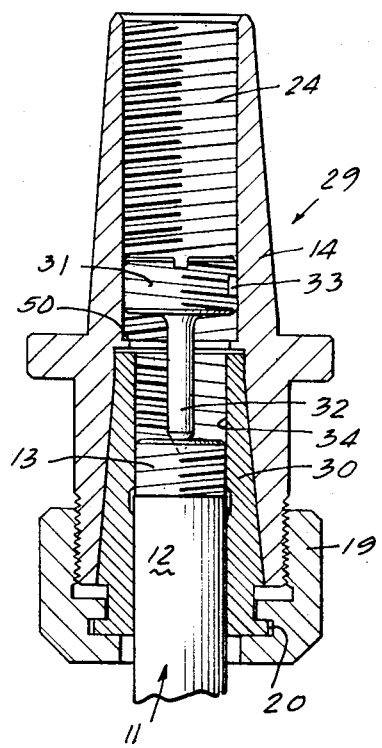
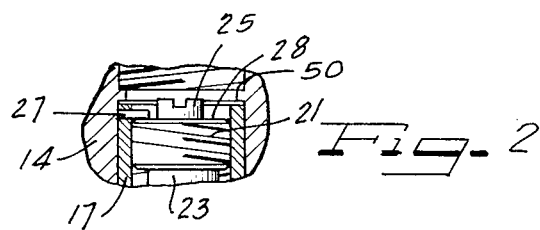
INVENTOR.
WALTER BATURKA

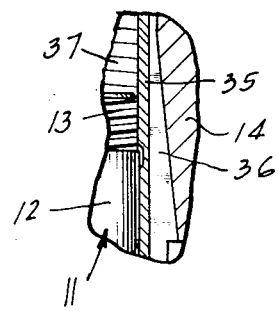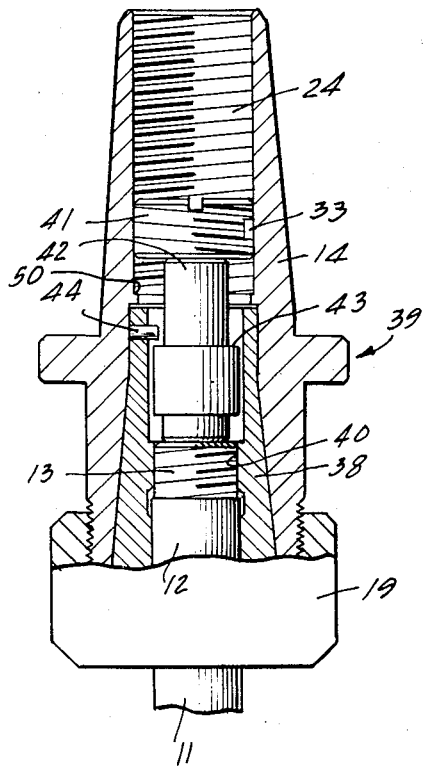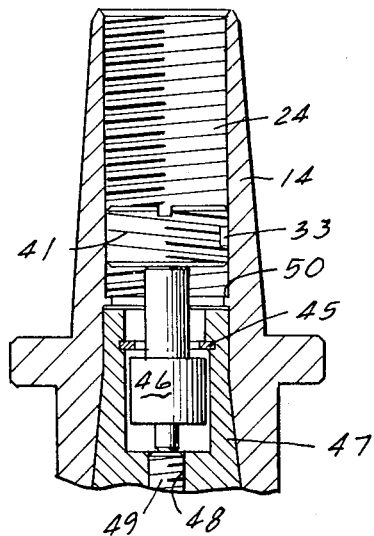

COLLET CHUCK FOR THREADED SHANK TOOLS

BACKGROUND OF THE INVENTION

1. Field of the Invention

This invention relates generally to tool holders, and more specifically to a tool adapter of the collet chuck type for use in a tool holder assembly.

2. Prior Art

A representative tool holder that has been used extensively commercially in the United States is shown in U.S. Pat. No. 2,719,722, and this tool holder includes a collet that can be used with various tools having straight shanks. However, up to now, it has been impractical to utilize such structure to hold a tool such as an end mill that has a straight threaded shank, examples of which are shown in U.S. Pat. No. 3.028,168 and 3,425,704. Tooling having shanks of the type disclosed in these last mentioned patents has been more popular in Europe than in the U.S.A., and has required other types of tool holders, of which the patents mentioned are representative. One disadvantage to the tool holders that accommodate threaded shanks is that such equipment cannot be readily adapted to accept tools having other types of shanks. Further, known tooling of this type has frequently been constructed in such a manner that concentricity has been ideally maintained. Still further, a problem with such equipment has been that it has been difficult or impossible to obtain accurate axial adjustment between the tool and the tool holder so as to compensate for minor variations in tool length, as results from regrinding of the tool.

SUMMARY OF THE INVENTION

According to my invention, a tool holder has been provided with a collet that is internally threaded, and a backup screw which applies a force on the end of the tool shank, the threads of the tool shank and the backup screw having a dissimilarity in pitch or hand so the slippage of the shank effects jamming of such dissimilarly pitched threads, the dissimilarly pitched threads having sufficient length so as to provide axial adjustability of the position of the tool with respect to the tool holder.

Accordingly, it is an object of the resent invention to provide a tool holder or collet chuck for use with tooling having a threaded shank.

Another object of the resent invention is to provide a tool holder wherein the basic holder will not only accept threaded shank tools, but will also accept tools having shanks that are not threaded.

A further object of the present invention is to provide a tool holder of the type described wherein concentricity is maintained to a very high degree.

Another further object of the present invention is to provide a tool holder of the type described wherein provision is made for axial adjustment of the tool position.

Many other advantages, features and additional objects of the present invention will become manifest to those versed in the art upon making reference to the detailed description and the accompanying drawings in which a preferred structural embodiment incorporating the principles of the present invention is shown by way of illustrative example.

ON THE DRAWINGS

FIG. 1 is a cross-sectional view of a tool adapter assembly for use in a tool holder, provided in accordance with the principles of the present invention, including a tool having a shank with a threaded end;

FIG. 2 is a fragmentary view of a portion of FIG. 1 illustrating a modification thereof;

FIG. 3 is a second embodiment of adapter assembly for a tool holder; FIG. 4 is a fragmentary view of a portion of FIG. 3 showing a modification thereof;

FIG. 5 is a cross-sectional view of a further embodiment of adapter assembly; and FIG. 6 illustrates a modification of the adapter assembly of FIG. 5.

AS SHOWN ON THE DRAWINGS

The principles of the present invention are particularly useful when embodied in an adapter assembly 10 illustrated in FIG. 1 for use in a tool holder assembly such as shown in U.S. Pat. No. 2,719,722. The adapter assembly 10 is shown in assembled relation with a tool 11 having a shank 12 with a threaded end portion 13. The adapter assembly 10 includes a body member 14 which is externally tapered and adapted for reception into a tool holder assembly, the body member 14 having a tapered bore 15 which terminates in a straight portion 16 of polygonal cross section whereby a positive drive is obtained from the body member 14 to a radially compressible collet member 17 which has a corresponding taper and polygonal inner end. The number and the location of slots in the collet 17 is conventional for present purposes, and any of several known arrangements for providing radial compressibility may be utilized. A collet member 17 has a threaded bore 18 which receives the threads 13 of the tool 11. A nut 19 is threaded to the body member 14 and has any one of several possible conventional or known structures such as the means 20 for urging the collet member 17 axially inward in response to tightening of the nut 19 and axially outward in response to loosening thereof. The clamping action described hereafter is thus augmented by the structure selected for the means 20.

In accordance with the present invention, one of the members 14, 17, in this embodiment the collet member 17, is provided with a backup screw 21 which has threads that mate with a further set of threads 22 that terminate in a shoulder 51 in the collet member 17. The backup screw 21 has an extension 23 of cylindrical form which is integral with the backup screw 21 for applying a force to the end of the shank 12 of the tool 11.

The threads 13,18 are dissimilar from the threads 21,22. In the embodiment shown, so that the reader can see this dissimilarity more easily, the dissimilarity has been illustrated as being a pitch of opposite hand. For convenience in manufacture, however, it can be preferred that the dissimilarity be one of different axial extent per thread. The dissimilarity in thread pitch is such that if the tool 11 slips in the collet member 17, and through friction with the screw extension 23 causes the backup screw 21 to rotate in the same direction, the parts are brought even more positively together. Where threads of opposite hand are utilized, the tool would tend to move further into the collet chuck as it has right hand threads, and the same direction of rotation would tend to move the backup screw 21 in the opposite axial direction, whereby a more positive supplemental force is applied to the tool 11 to hold it against further turning within the collet member 17.

The body member 14 has a set of left had threads 24 separated from the straight portion 16 by a shoulder 50, and which are not used in this embodiment, but which are used where different types of radially compressible collet members are utilized.

The backup screw has a slotted boss 25 which projects axially beyond a snap ring 26 which serves as a limiting means and also in a secondary fashion as a retaining means. If desired for certain sizes of tooling, it may be preferable to replace the snap ring 26 with a pin 27 as shown in FIG. 2. The backup screw 21 has an annular shoulder 28 which surround the boss 25 and the limiting and retaining means 26,27 project radially in overlapping relation to the shoulder 28 and spaced relation to the slot of the boss 25. By this arrangement, it is impossible for the limiting means 26,27 to be affected or to cause any effect by any type of interaction with the slot.

To install the tool 11, the backup screw 21 is retracted so that it engages the limiting means 26 or 27 as shown. The tool 11 is then turned so as to mate its threads 13 with the threads 18 until the threaded end portion 13 is engages the screw extension 23, approximately finger tight. The nut 19 is then tightened, but not fully. At this point, as the threads 22 have an axial extent, the tool can be backed out to provide the correct axial length of the assembly. Then the nut 19 is given its final tightening, after which the backup screw 21 is given a further tightening until it is tight against the end of the tool.

During use, any tendency on the part of the part of the tool 11 to rotate relatively to the collet 17 would result in slight axially inward movement. The frictional contacts between the tool 11 and the backup screw 21 will lock the parts together even tighter because of the thread dissimilarity, whereby a positive drive from the collet member 17 to the tool 11 is ensured.

The limiting means 26,27 in the position illustrated prevent jamming of the unthreaded portion of the shank 12 against the adjacent end of the threads 18. The means 26,27 further serves to retain the backup screw within the collet member 17 during separate handling thereof.

This embodiment of the invention is particularly useful in that it can be converted to accommodate other types of tooling by merely changing the collet member 17 or the collet member 17 and the nut 19 whereby a wide variety of tools can be accommodated. The axial adjustment in this embodiment is about three-sixteenths inch for the backup screw 21, which adjustment allows for wear and shortening due to regrinding. The length of this adjustment is preferably no greater than one-half the axial length of the threads 13, whereby at least half of the threads 13 are mated with the threads 18. The adaptability of this structure to other types of tool shanks, the positive drive that s provided from the collet to the tool and the axial adjustability are all important features that are achieved by this device.

In FIG. 3 there is shown a second embodiment of adapter assembly 29 which includes the same body member 14 and nut 19, and accommodates the same tool 11. It has a radially compressible collet member 30, the external configuration of which is the same as that of the collet member 17 whereby the means 20 for urging the collet member 30 axially is as described previously. In this embodiment, a backup screw 31 is again provided with threads having a pitch dissimilarity, here of left hand pitch and mating with the left hand threads 24 in the body member 14. The backup screw 31 has a cylindrical screw extension 32 that is integral therewith, there being a friction element 33 to prevent too easy turning of the backup screw 31 and thus serving as a retaining means. In this embodiment, the tool 11 is first inserted so that its non-threaded portion of the shank just engages the ends of the threads 34 which correspond to the threads 18 of the first embodiment. Such engagement can be used as the starting point defined by the limiting means 26,27 of the first embodiment. Preferably, the tool is backed out slightly so that any tendency to slip and to enter further will not in any way damage the threads 34. With this arrangement, a force is provided between the dissimilar threads, such force appearing on the end of the tool 11. With the threads 13 in full engagement with the threads 34, there is a clearance between the threaded backup screw 31 and the shoulder 50 which is preferably no greater than one-half the length of the threads 13 to ensure mating of at least one-half of the threads 13. The shoulder 50 also prevents the screw 31 from engaging the collet 30, thereby preventing unseating thereof.

If it is desired to utilize in place of the collet member 30 one that has no threads, an advantageous way of doing so is shown in FIG. 4 where a slotted and hence compressible liner 35 is inserted into the bore of the slightly larger collet member 36, the sleeve 35 having threads 37 with which the tool threads 13 engage.

In the embodiment of FIG. 5, a radially compressible collet member 38 forms part of an adapter assembly 39 and is internally threaded as at 40 to receive the threads 13 of the tool 11. The backup screw 41 is like the backup screw 31 secured in the threads 24 in the body member 14. The backup screw 41 is provided with a screw extension 42 of cylindrical shape through which the forces are applied to the end of the shank of the tool 11. The screw extension 42 is separate from the backup screw 41, and has a shoulder 43 analogous to the shoulder 28 of FIG. 1 against which a radially projecting pin 44 can engage. The pin 44 serves primarily as a limiting means as previously described, and also serves as a retaining means, but in this embodiment, it serves to retain the screw extension 42. As before, the pin 44 may be replaced by an annular snap ring 45 as shown in FIG. 6. The pin 44 and the ring 45 thus also serve as a retaining means for the screw extension 42 and a screw extension 46 whenever the collet member 38 or a collet member 47 are handled separately. With this configuration, the mode of initial alignment and the operation are as described for the first embodiment. When tooling having smaller shanks is to be employed, as shown in FIG. 6, the collet member 17 is provided with a somewhat smaller threaded bore 48 that receives the threads 49 of another tool. The screw extensions 42 and 46 are also under-cut to provide a smaller diameter at the end that engages the tool to ensure that the force is transmitted to the end of the tool shank and also as the central portion of the screw extensions 42,26 are of greater diameter than the tool threads, the screw extension 42,26 are thereby retained against falling out in the opposite direction when no tool is present. Although various minor modifications might be suggested by those versed in the art, it should be understood that I wish to embody within the scope of the patent warranted hereon, all such embodiments as reasonably and properly come within the scope of my contribution to the art.

I claim as my invention:

1. An adapter assembly for a tool holder, comprising:
   a. a body member adapted to be secured to the tool holder and having a tapered bore;
   b. a radially compressible collet member received and said tapered bore and having a corresponding external taper, said collet member having a threaded bore for receiving the threaded end and shank of a tool;
   c. a nut threaded onto said body member and having means for urging said collet member axially with respect to said bore; and
   d. a back-up screw threaded onto one of said members for providing a force on the end of the tool shank, the threads of said threaded bore and the threads of said back-up screw being dissimilar and arranged to increase said force as a consequence of any joint rotation of the tool and said back-up screw with respect to said collet due to tool slippage within said collet, to thereby terminate any such slippage.

2. An adapter assembly according to claim 1, including means on said collet member for limiting the extent that the threaded end of the tool can enter said threaded bore of said collet member.

3. An adapter assembly according to claim 1 including a screw extension disposed between the threaded portion of said backup screw and the tool shank, and through which said force is transmitted.

4. An adapter assembly according to claim 3 in which said screw extension is cylindrical.

5. An adapter assembly according to claim 3 in which said screw extension is integral with said backup screw.

6. An adapter assembly according to claim 3 in which said screw extension is a separate element.

7. An adapter assembly according to claim 6 including means on said collet member for retaining said screw extension therein.

8. An adapter assembly according to claim 6 in which said retaining means and said screw extension also serve as means for limiting the extent that the threaded end of the tool can enter said threaded bore of said collet member.

9. An adapter assembly according to claim 2 including a screw extension disposed between the threaded portion of said backup screw and the tool shank, through which said force is transmitted, and trapped in said collet member by said limiting means.

10. An adapter assembly according to claim 2 in which said limiting means comprises a pin projecting into the bore of said collet member.

11. An adapter assembly according to claim 2 in which said limiting means comprises a snap ring whose internal periphery projects into the bore of said collet member.

12. An adapter assembly according to claim 1 in which both the threads for the tool shank and the threads for said backup screw are in said collet member.

13. An adapter assembly according to claim 12 in which said backup screw has a slotted boss directed axially away from the tool shank, and a retainer carried by said collet member and acting on a shoulder surrounding said boss, remotely from its slot.

14. An adapter assembly according to claim 1 in which the threads for said backup screw are in said body member.

15. An adapter assembly according to claim 1 in which said threaded bore is provided in a radially compressible sleeve disposed in said collet.

16. An adapter assembly according to claim 12 including a screw extension integral with said backup screw through which said force is transmitted to the tool shank, and means on said collet member for retaining said backup screw in said collet member.

17. An adapter assembly according to claim 16 in which said retaining means also limits the extent that the threaded end of the tool can enter said threaded bore of said collet member.

18. An adapter assembly according to claim 1 in which the dissimilarity in the threads is provided by the threads being of different axial length per thread.

19. An adapter assembly according to claim 1 in which the dissimilarity in the thread is provided by the threads being of opposite hand.

20. An adapter assembly according to claim 1 in which said dissimilar threads have an axial extent such as to enable the tool to be placed in a selected axial position within the assembly.

21. An adapter assembly according to claim 14 including an internal shoulder on said body member separating the threads for said backup screw from said collet member.

22. An adapter assembly according to claim 1 including means by which the axial adjustability of said backup screw is limited so as to enable at least one-half of the threads of the tool shank to be received by said collet member.

23. An adapter assembly according to claim 22 in which the limit means is a shoulder between the threads for the backup screw and the threads for the tool shank.

24. An adapter assembly according to claim 23 in which said shoulder is on said collet member.

25. An adapter assembly according to claim 23 in which said shoulder is on said body member.

* * * * *